(12) United States Patent
Watanabe et al.

(10) Patent No.: US 9,964,810 B2
(45) Date of Patent: May 8, 2018

(54) DISPLAY PANEL

(71) Applicant: Sharp Kabushiki Kaisha, Osaka (JP)

(72) Inventors: Hisashi Watanabe, Osaka (JP);
Masayuki Kanehiro, Osaka (JP);
Youhei Nakanishi, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 88 days.

(21) Appl. No.: 14/914,845

(22) PCT Filed: Aug. 4, 2014

(86) PCT No.: PCT/JP2014/070485
§ 371 (c)(1),
(2) Date: Feb. 26, 2016

(87) PCT Pub. No.: WO2015/033721
PCT Pub. Date: Mar. 12, 2015

(65) Prior Publication Data
US 2016/0202516 A1    Jul. 14, 2016

(30) Foreign Application Priority Data

Sep. 4, 2013   (JP) ................................. 2013-183286

(51) Int. Cl.
*G02F 1/1339* (2006.01)
*G02F 1/1337* (2006.01)
*G02F 1/1341* (2006.01)

(52) U.S. Cl.
CPC .......... *G02F 1/1339* (2013.01); *G02F 1/1337* (2013.01); *G02F 1/1341* (2013.01); *G02F 2001/133742* (2013.01); *G02F 2201/56* (2013.01)

(58) Field of Classification Search
CPC .... G02F 1/1339; G02F 1/1337; G02F 1/1341; G02F 2201/56; G02F 2001/133742
USPC ........................................ 349/153, 290, 190
See application file for complete search history.

(56) References Cited

U.S. PATENT DOCUMENTS

| 8,248,573 | B2 * | 8/2012 | Kurosaki | G02F 1/1341 349/115 |
| 2003/0235722 | A1 * | 12/2003 | Blanckaert | G02F 1/1347 429/9 |
| 2009/0009707 | A1 * | 1/2009 | Kurosaki | G02F 1/1341 349/154 |
| 2009/0051636 | A1 | 2/2009 | Natori | |

(Continued)

FOREIGN PATENT DOCUMENTS

| JP | 57-53727 A | 3/1982 |
| JP | 357201219 | * 12/1982 |
| JP | 61-174513 A | 8/1986 |

(Continued)

*Primary Examiner* — Hoan C Nguyen
(74) *Attorney, Agent, or Firm* — Chen Yoshimura LLP

(57) ABSTRACT

A display panel includes a pair of substrates a display medium layer held between the pair of substrates and has a display region and a frame region outside the display region and a hole on an inner side of the frame region penetrating the pair of substrates and the display medium layer. The display panel further includes a hole-periphery sealing part disposed between the pair of substrates so as to surround the hole, in which the hole-periphery sealing part includes an angled portion or a protrusion.

4 Claims, 15 Drawing Sheets

(56) References Cited

U.S. PATENT DOCUMENTS

2011/0285934 A1  11/2011  Watanabe
2016/0011633 A1  1/2016  Watanabe et al.

FOREIGN PATENT DOCUMENTS

| JP | 2001331961 A | * | 11/2001 |
| JP | 2004-329694 A | | 11/2004 |
| JP | 2005-46352 A | | 2/2005 |
| JP | 2009-47902 A | | 3/2009 |
| JP | 2010-139657 A | | 6/2010 |
| JP | 2012133184 A | * | 7/2012 |
| WO | 2010/089998 A1 | | 8/2010 |
| WO | 2014/41893 A1 | | 9/2014 |

* cited by examiner (a)

(b)

(c)

(d)

(a)

(b)

(c)

(d)

(a)

(b)

(c)

DISPLAY PANEL

TECHNICAL FIELD

The present invention relates to a display panel provided with a hole in the display region thereof.

BACKGROUND ART

In general, transmissive liquid crystal display devices usually include a liquid crystal panel, a backlight unit, a circuit substrate or a power supply for supplying various types of electrical signals to the liquid crystal panel, a case for housing these, and the like.

The liquid crystal panel has a display region (active area) in which a plurality of pixels are arrayed, and a frame region (non-active area) outside the display region. The display region includes pixel electrodes, TFTs (thin film transistors), and the like, and displays images or video. Meanwhile, the frame region has a sealing member for sealing liquid crystal material between substrates, wiring or a monolithically-formed driver circuit connected to scan lines or signal lines, terminals that connect to an external driver circuit, and the like. The frame region is not used for image or video display.

The frame region of the liquid crystal panel does not contribute to display, and it is therefore preferable that the frame region be made narrow. Yet, while the frame region of liquid crystal panels has been progressively narrowed over the years, completely eliminating the frame region is difficult in principle.

Conventional research has focused on narrowing or obscuring the frame region on the display panel. The subject applicants have disclosed in Patent Document 1 a display device in which a transmissive cover is disposed on the viewer side of the display panel. In this display device, the edge of the transmissive cover has a convex curved portion that function as a lens.

The convex curved portion (lens portion) of the transmissive cover is typically disposed so as to cover the frame region of the display panel and a part of the display region near the frame region (hereinafter, also referred to as the "peripheral display region"). The light emitted from the pixels (peripheral pixels) in the peripheral display region refract at the lens portion. This results in the image formed by the peripheral pixels being magnified and displayed on the front side of the frame region. Because of this effect, the frame region becomes obscured or appears as if the frame region does not exist.

By using the display device described above, it becomes possible to provide a portable electronic device (smartphone or the like) in which almost the entire panel surface on the viewer side of the electronic device is capable of display, for example. This type of electronic device has a large area capable of content display relative to its size, and is thus advantageous in terms of making the device more compact.

RELATED ART DOCUMENTS

Patent Documents

Patent Document 1: WO 2010/089998
Patent Document 2: Japanese Patent Application Laid-Open Publication No. 2005-46352
Patent Document 3: Japanese Patent Application Laid-Open Publication No. 2009-47902
Patent Document 4: Japanese Patent Application Laid-Open Publication No. 2004-329694

SUMMARY OF THE INVENTION

Problems to be Solved by the Invention

Although there are attempts to use the entire viewer side surface for display, eliminating the frame region completely would also eliminate the space on the front side of the panel where a physical button, a camera, or the like is arranged conventionally.

Regarding this point, the subject applicants have disclosed in PCT/JP2014/054966 a configuration in which a through-hole is provided on an inner side of the frame region of the display panel, namely within the display region, and an input device such as a button is provided in this hole. All the contents disclosed in PCT/JP2014/054966 are incorporated by reference in the present specification.

Patent Documents 2 to 4 also have disclosed the configuration in which a through-hole is provided in the display region of the liquid crystal panel, for example. Patent Documents 2 and 3 have disclosed a configuration in which wiring for driving pixels is arranged so as to avoid the through-hole. Also, Patent Document 4 mentions a sealing member and spacers provided around the hole.

However, the research by the inventors of the present invention has revealed that, when configuring a display medium layer using fluid material such as liquid crystal material, providing a through-hole in the display panel in the conventional configuration is likely to degrade the display quality around the hole, for example.

The present invention has been developed to solve the problems described above and aims to prevent the degradation of display quality in a display panel having a hole in the display region thereof.

Means for Solving the Problems

A display panel according to an embodiment of the present invention includes a pair of substrates and a display medium layer held between the pair of substrates, the display panel having a display region and a frame region outside the display region and including a hole on an inner side of the frame region penetrating the pair of substrates and the display medium layer, the display panel further including: a hole-periphery sealing part disposed between the pair of substrates so as to surround the hole, wherein the hole-periphery sealing part includes an angled portion or a protrusion.

In an embodiment, the display panel described above further includes: an outer sealing part provided so as to surround the display medium layer, wherein the outer sealing part includes an open section in a portion thereof, and wherein the angled portion or the protrusion of the hole-periphery sealing part is provided, behind the hole as seen from the open section of the outer sealing part, on or near a straight line going through the open section and across the hole.

In an embodiment, the display panel described above further includes: an outer sealing part provided so as to surround the display medium layer, wherein the outer sealing part is provided in a closed loop shape, and wherein the angled portion or the protrusion of the hole-periphery sealing part is provided, behind the hole as seen from a center of the display region, on or near a straight line going through a center of the hole and the center of the display region.

In an embodiment, the hole-periphery sealing part includes the angled portion, and the hole includes an angled portion that corresponds to the angled portion of the hole-periphery sealing part.

A display panel according to an embodiment of the present invention includes a pair of substrates and a display medium layer held between the pair of substrates, the display panel having a display region and a frame region outside the display region and including a hole on an inner side of the frame region penetrating the pair of substrates and the display medium layer, the display panel further including: a hole-periphery sealing part disposed between the pair of substrates so as to surround the hole; and at least one layered structure formed on at least one of the pair of substrates at a side facing the display medium layer, wherein the at least one layered structure is not formed in a region outside and adjacent to the hole-periphery sealing part so that a cell gap of the region is larger than a cell gap of another region where the at least one layered structure is formed.

In an embodiment, the at least one layered structure includes at least one layer among a color filter layer, an overcoat layer, a protective layer, and an interlayer insulating layer.

A display panel according to an embodiment of the present invention includes a pair of substrates and a display medium layer held between the pair of substrates, the display panel having a display region and a frame region outside the display region and including a hole on an inner side of the frame region penetrating the pair of substrates and the display medium layer, the display panel further including: a hole-periphery sealing part disposed between the pair of substrates so as to surround the hole; and at least one vertical alignment film formed on at least one of the pair of substrates at a side facing the display medium layer, wherein the at least one vertical alignment film is not formed in a region outside and adjacent to the hole-periphery sealing part.

An electronic device according an embodiment of the present invention includes: the display panel according to any one of items 1 to 7; and an input/output device arranged in the hole in the display panel.

A method of manufacturing a liquid crystal panel according to an embodiment of the present invention includes: a step of preparing a pair of substrates; a step of providing an outer sealing part and a hole-periphery sealing part on one of the pair of substrates; a step of spreading liquid crystal material over a surface of the one substrate by allowing the liquid crystal material provided at a location away from the hole-periphery sealing part to flow; a step of bonding the pair of substrates via the outer sealing part and the hole-periphery sealing part; a step of forming a hole within a region in the pair of substrates enclosed by the hole-periphery sealing part, wherein the hole-periphery sealing part includes an angled portion or a protrusion, wherein, in the step of spreading the liquid crystal material, the liquid crystal material spreads around the hole-periphery sealing part in at least two flows heading in mutually different directions and wrapping around the hole-periphery sealing part, and wherein the angled portion or the protrusion of the hole-periphery sealing part is provided at a point where the at least two flows heading in mutually different directions join together.

Effects of the Invention

According to a display panel of respective embodiments of the present invention, even when a through-hole is provided in the display region thereof, the degradation of display quality around the hole can be prevented.

BRIEF DESCRIPTION OF THE DRAWINGS

FIG. 3(a) is a plan view, and FIG. 3(b) is a cross-sectional view of FIG. 3(a) along the line x-x.

FIG. 5(a) shows the angle of an angled portion, FIG. 5(b) shows a panel configuration of a reference example, and FIGS. 5(c) and 5(d) are plan views showing a panel configuration of respective modification examples.

FIG. 7(a) is a plan view, and FIG. 7(b) is a cross-sectional view of FIG. 7(a) along the line x-x.

FIGS. 8(a) to 8(d) are plan views showing a panel configuration of respective modification examples.

FIG. 9(a) is a plan view, and FIG. 9(b) is a cross-sectional view of FIG. 9(a) along the line x-x.

FIG. 12(a) is a plan view, and FIGS. 12(b) and 12(c) are cross-sectional views showing a step immediately before substrates are bonded together and a step immediately after the substrates are bonded together, respectively.

FIG. 13(a) is a plan view, and FIG. 13(b) is a cross-sectional view.

FIG. 14(a) is a plan view, FIG. 14(b) is an enlarged plan view of the section around the hole-periphery part, and FIG. 14(c) is a plan view of a reference example corresponding to FIG. 14(b).

FIG. 15(a) is a plan view, and FIG. 15(b) is a cross-sectional view.

DETAILED DESCRIPTION OF EMBODIMENTS

Before describing embodiments of the present invention, causes of display anomalies around a hole, found by the inventors of the present invention, that can occur in a display panel provided with a through-hole in the display region thereof will be described. Although descriptions below are about a panel (liquid crystal panel) having a liquid crystal layer as a display medium layer, the same descriptions will apply to a display panel with a display medium layer having fluidity besides a liquid crystal panel such as a display panel included in an electrophoretic display device or an electrowetting display device.

When a through-hole is provided in the display region of a liquid crystal panel, in order to appropriately seal liquid crystal material between substrates, liquid crystal material should be made not to leak from the hole. For this purpose, in addition to providing an outer frame sealing part (referred to as an outer sealing part below) along the periphery of the substrates, a sealing part also needs to be provided around the hole penetrating through the substrates (referred to as a hole-periphery sealing part below) so as to seal the liquid crystal material between the substrates.

However, research by the inventors of the present invention found that bubbles occur around the hole-periphery sealing part in a liquid crystal panel provided with the hole-periphery sealing part when liquid crystal material is provided between the substrates by a vacuum injection method or the ODF (one drop fill) method. A more specific description will be provided below.

Figure 1:
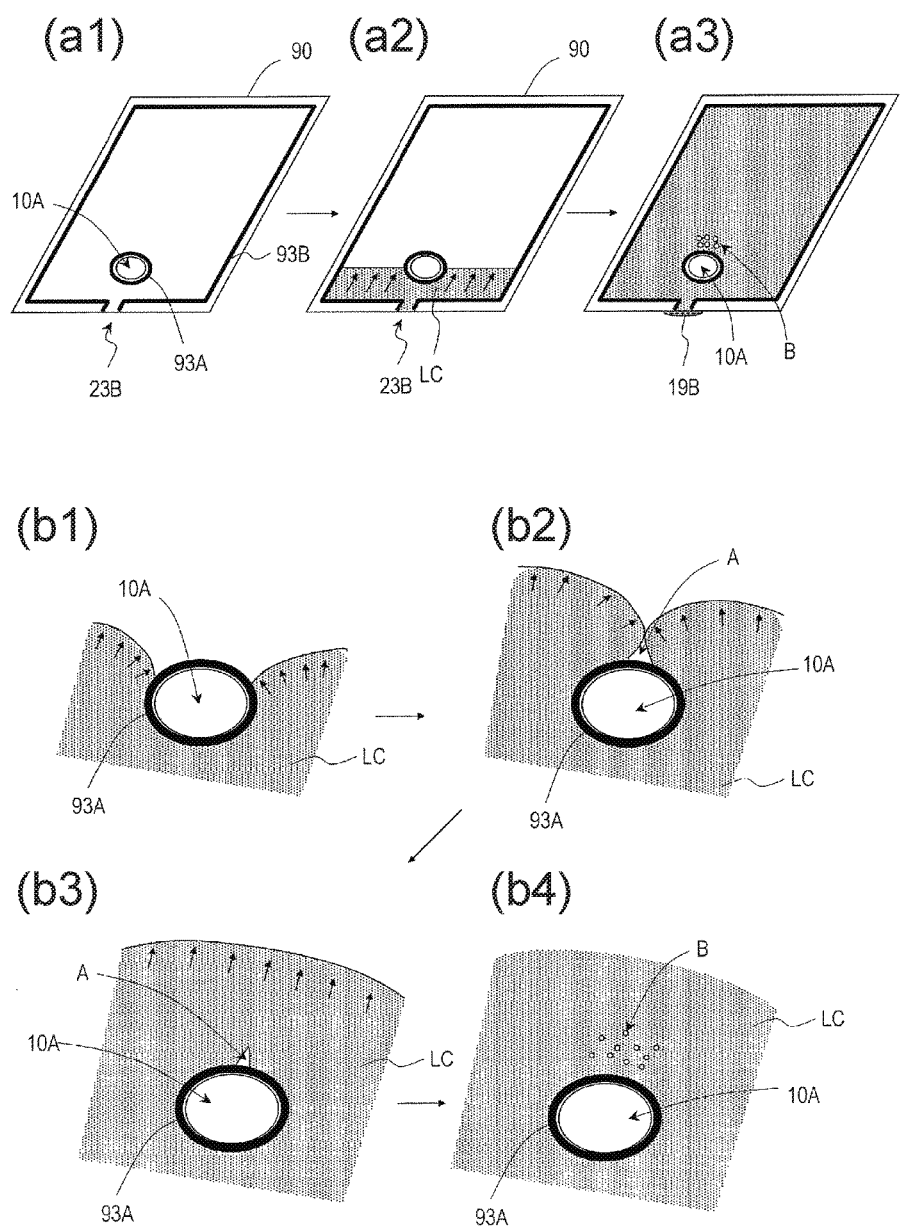
FIG. 1 is a view for describing a manufacturing process of a liquid crystal panel according to Reference Example 1, FIGS. 1(a1) to 1(a3) are perspective views each showing different steps, and FIGS. 1(b1) to 1(b4) are enlarged perspective views around the hole in a liquid crystal sealing process.

FIGS. 1(a1) to 1(a3) and 1(b1) to 1(b4) show a manufacturing process of a liquid crystal panel according to Reference Example 1 in which a liquid crystal layer is formed by the vacuum injection method.

First, as shown in FIG. 1(a1), a pair of substrates 90 that are facing each other with a gap therebetween for injecting liquid crystal material is prepared. The pair of substrates 90 are bonded together by an outer sealing part 93B provided around the periphery of the substrates. In the present reference example, a liquid crystal injection hole 23B is provided in the outer sealing part 93B because a liquid crystal layer is provided between the substrates by the liquid crystal vacuum injection method.

Within the region surrounded by the outer sealing part 93B, a hole 10A is formed so as to penetrate the pair of substrates 90, and a hole-periphery sealing part 93A having a closed-loop shape is provided around the hole 10A.

The pair of substrates 90 (namely, an empty cell) that are bonded together is placed in a vacuum, and under that condition, the liquid crystal injection hole 23B makes contact with liquid crystal material. Next, as shown in FIG. 1(a2), by placing the pair of substrates back under atmospheric pressure, liquid crystal material LC is injected into the empty cell from the liquid crystal injection hole 23B. The liquid crystal material LC spreads from the liquid crystal injection hole 23B toward the back of the empty cell through the gap between the substrates.

In this step, as shown in FIG. 1(b1), after making contact with the hole-periphery sealing part 93A on the outer side of the hole 10A from the front side, the liquid crystal material LC entered into the empty cell spreads toward the back side of the hole-periphery sealing part 93A so as to wrap around the hole-periphery sealing part 93A. However, when the shape of the hole-periphery sealing part 93A is a circular loop or the like, the liquid crystal material may not wrap around quickly to the side of the hole opposite to where the liquid crystal material LC first reaches (the back of the hole 10A), for example. As a result, as shown in FIG. 1(b2), the liquid crystal material LC that wrapped around from both the left side and the right side of the hole 10A cannot flow along the periphery of the hole-periphery sealing part 93A. The flows from the left side and the right side join together behind the hole 10A forming a gap A.

Thereafter, as shown in FIG. 1(b3), the injection of the liquid crystal material LC proceeds while leaving the gap A behind the hole 10A. The size of the gap A formed in a manner described above depends on the vacuum level, and the lower the vacuum level, the bigger the gap A will be.

When a liquid crystal injection process is performed in this manner, as shown in FIGS. 1(a3) and 1(b4), after the injection hole 23B is sealed with a sealing resin 19B, the gap A is dispersed thereby forming and leaving fine bubbles B around the hole 10A. If the bubbles B remain, the display quality around the hole is degraded. The bubbles B can occur not only when the hole is circular but also when the hole has other shapes such as a square.

The process by which bubbles occur in the liquid crystal layer near the hole-periphery sealing part 93A when performing a liquid crystal filling process by the vacuum injection method was described above; however, bubbles can also occur when performing a liquid crystal filling process by the ODF method. Details are explained below.

Figure 2:
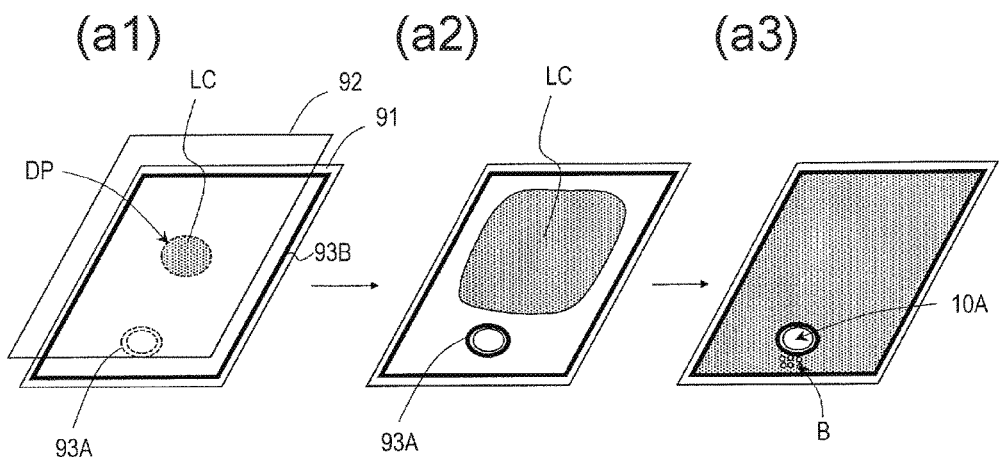
FIG. 2 is a view for describing a manufacturing process of a liquid crystal panel according to Reference Example 2, and FIGS. 2(a1) to 2(a3) are perspective views each showing different steps.

FIGS. 2(a1) to 2(a3) show a manufacturing process of a liquid crystal panel according to Reference Example 2, in which a liquid crystal layer is formed by the ODF method.

First, as shown in FIG. 2(a1), under a vacuum, an outer sealing part 93B and a hole-periphery sealing part 93A are provided on one substrate 91, and liquid crystal material LC is dripped at a drip location DP in the center of the panel. Thereafter, the sealing parts are cured by irradiating the parts with ultraviolet light or the like after bonding the substrate 91 to another substrate 92. In the ODF method, in order to prevent the liquid crystal material from making contact with the pre-cured sealing parts and becoming contaminated, the liquid crystal material is often dripped at a location away from the sealing parts (normally, around the center of the panel).

In this bonding process, as shown in FIG. 2(a2), the liquid crystal material LC spreads out from the drip location toward the periphery of the substrates through the gap between the substrates.

In this case, in a manner similar to the cases shown in FIGS. 1(b1) to 1(b4), the liquid crystal material LC spreads while leaving a gap A on the side of the hole-periphery sealing part 93A opposite to where the liquid crystal material first makes contact (in other words, the side opposite to the side of the drip location DP). Because of this, as shown in FIG. 2(a3), bubbles B can be left around the hole 10A.

In view of these problems, the inventors of the present invention conducted diligent research on methods of preventing the occurrence of the bubbles B around the hole 10A. As a result, the researchers found that designing the shape of the hole-periphery sealing part and configuring the display panel around the hole appropriately can reduce the occurrence of bubbles.

Embodiments of the present invention are described below with reference to figures, but the present invention is not limited to these embodiments.

Embodiment 1

Figure 3:
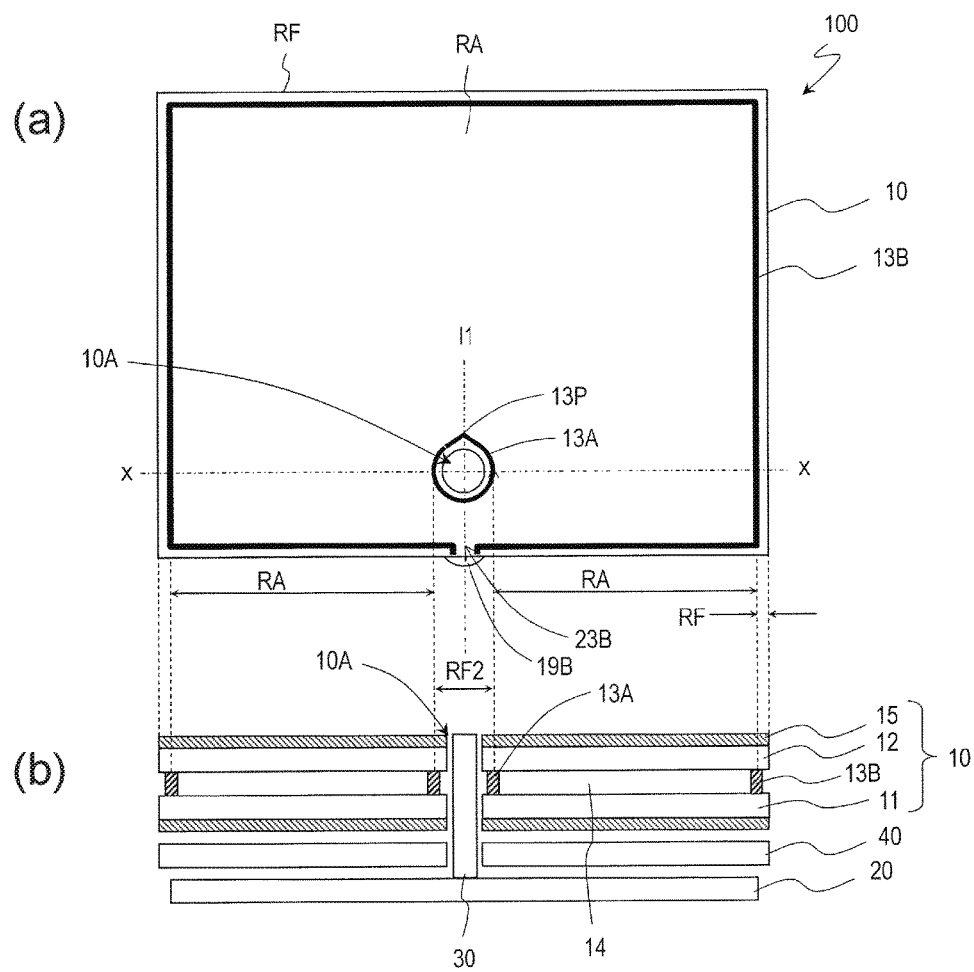
FIG. 3 is a view showing a configuration of a liquid crystal display device according to Embodiment 1 of the present invention.

FIGS. 3(a) and 3(b) are a plan view and a cross-sectional view of a liquid crystal display device 100 that includes a liquid crystal panel 10 of Embodiment 1. FIG. 3(b) shows a cross-section along the line x-x in FIG. 3(a).

The liquid crystal display device 100 may be various types of electronic devices as long as the device includes the liquid crystal panel 10. In the present specification, all electronic devices that include the liquid crystal panel 10 may be referred to as "liquid crystal display devices." In a similar manner, all electronic devices that include a display panel may be referred to as "display devices."

The liquid crystal display device 100 (alternatively, an electronic device) may be a portable gaming device, smartphone, mobile phone, PDA (personal digital assistant), tablet terminal, electronic book reader, music player, camera, electronic dictionary, electronic notebook, navigation system, display device, personal computer, wearable computer, wrist watch, game machine, television, information display, or the like, for example.

A display panel (namely, a liquid crystal panel) that uses a liquid crystal layer as a display medium layer is used below as an example. However, the present invention is not limited to the example. In various types of electronic devices that include a display panel using other display medium layers having fluidity such as an electrophoretic display device or an electrowetting display device, the same configuration as that described below can be applied.

A specific configuration of the liquid crystal display device 100 will be described below. The liquid crystal display device 100 includes the liquid crystal panel 10 and a circuit substrate 20 arranged on the back side of the liquid crystal panel 10. The liquid crystal display device 100 is a transmissive liquid crystal display device and includes a backlight 40 provided between the liquid crystal panel 10 and the circuit substrate 20.

The backlight 40 may be an edge-lit backlight that has, in addition to light sources such as LEDs, optical elements such as a light guide plate, diffusion plate, reflective plate, and the like. The backlight 40 may be a direct-lit (surface-emitting type) backlight that is configured using surface-emitting elements or the like.

The liquid crystal panel 10 includes a TFT substrate 11 (active matrix substrate) having pixels arranged in an array, an opposite substrate 12 that opposes the TFT substrate 11 with a gap therebetween, and a liquid crystal layer 14 that is held between the pair of the substrates 11 and 12. An optical film layer 15 constituted by a polarizing plate, a retardation film, or the like is bonded via an adhesive layer to the outer side of the TFT substrate 11 and the opposite substrate 12.

There may be various types of display modes of the liquid crystal display device 100. In the vertical alignment (VA) mode that performs full color display, for each of the pixels, a TFT and a pixel electrode connected thereto are provided on the TFT substrate 11, and a common electrode, a color filter layer, a black matrix, and the like are provided on the opposite substrate 12, for example. In a horizontal electric field mode such as FFS (fringe field switching) mode, the TFT substrate 11 includes pixel electrodes having a plurality of slits and elongated electrodes, a common electrode used to create horizontal electric fields between the common electrode and these pixel electrodes, and the like. In the display mode using PDLC (polymer dispersed liquid crystal), the optical film layer 15 does not need to be included.

In the liquid crystal display device 100 of the present embodiment, the hole 10A that penetrates the liquid crystal panel 10 is provided on an inner side of a frame region RF (namely, display region RA). An input/output device 30 described later is arranged inside the hole 10A.

The diameter of the hole 10A may be set as desired in accordance with the configuration of the input/output device 30; however, the diameter is set to about 1 mm to about 15 mm, for example. The configuration of the present embodiment is effective in preventing the occurrence of bubbles described later, particularly when the diameter of the hole 10A is relatively small (less than or equal to 10 mm).

A hole-periphery sealing part 13A is provided around the hole 10A in the liquid crystal panel 10. A frame-shaped outer sealing part 13B is provided along the periphery of the liquid crystal panel 10. In the present embodiment, a liquid crystal injection hole 23B is provided in the outer sealing part 13B because liquid crystal material is injected by the vacuum injection method, and the liquid crystal injection hole 23B is sealed with a sealing resin 19B. In this configuration, the liquid crystal layer 14 is sealed between the pair of the substrates 11 and 12 by the outer sealing part 13B, the sealing resin 19B, and further by the hole-periphery sealing part 13A.

In the present embodiment, a part of the hole-periphery sealing part 13A having roughly a circular loop shape includes an angled portion having a doglegged shape or protrusion 13P (referred to as the "angled portion 13P"). The angled portion 13P is provided, on the side of the hole 10A opposite to the side closer to the liquid crystal injection hole 23B (behind the hole 10A as seen from the injection hole 23B), on or near a straight line 11 going through the center of the liquid crystal injection hole 23B and the center of the hole 10A.

It should be noted that, in the present specification, the area inside the frame region RF, which is formed at the periphery of the liquid crystal panel 10, is referred to, for convenience, as the "display region RA." However, the display region RA may include a region that does not contribute to display (non-display region other than the outer frame region). In the present embodiment, as shown in FIG. 2(b), a non-display region RF2 is formed within the display region RA around the hole 10A. The non-display region RF2 includes the hole 10A itself, the hole-periphery sealing part 13A, a region provided with a light-shielding member (not shown) that prevents light leakage around the hole 10A, and the like.

Here, a process of forming the liquid crystal layer 14 of the liquid crystal panel 10 is described.

Figure 4:
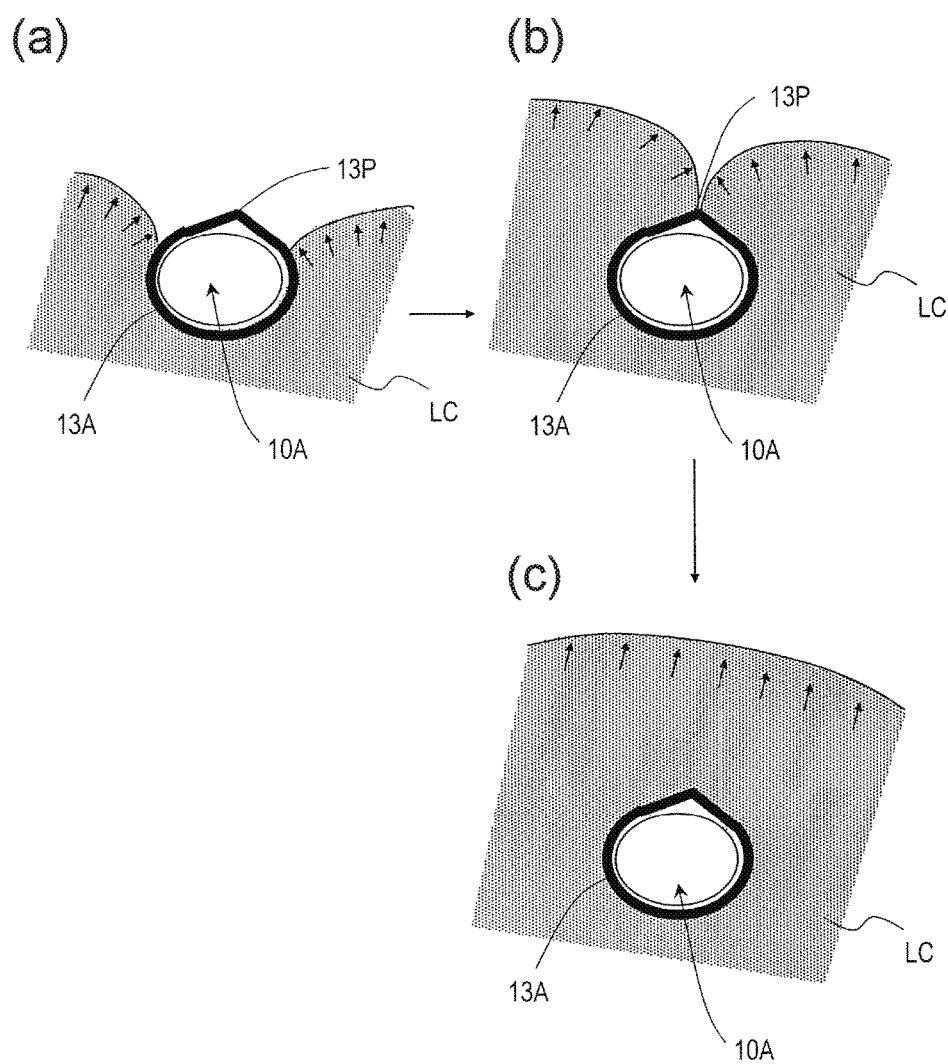
FIGS. 4(a) to 4(c) sequentially show steps of how liquid crystal material flows around the hole in a manufacturing process of a liquid crystal panel included in a liquid crystal display device of Embodiment 1.

FIGS. 4(a) to 4(c) show the flow of the liquid crystal material LC around the hole 10A when the liquid crystal material LC is injected into the empty cell by the vacuum injection method.

As shown in FIG. 4(a), in the process of injecting the liquid crystal material LC from the side of the injection hole 23B (see FIG. 3(a)) toward the back of the empty cell, the liquid crystal material LC makes contact with the front side of the hole-periphery sealing member 13A. Thereafter, the liquid crystal material separates into two flows to the left and the right along the hole-periphery sealing member 13A, and the two flows spread toward the back side of the hole-periphery sealing member 13A.

Next, as shown in FIG. 4(b), the liquid crystal material LC wraps around from the left side and the right side toward the back side of the hole-periphery sealing member 13A. In this step, the liquid crystal material LC flows along the hole-periphery sealing member 13A because the hole-periphery sealing member 13A includes the angled portion 13P, and the flows that wrapped around from the left side and the right side of the hole-periphery sealing member 13A join together near the angled portion 13P. Unlike the case shown in FIG.

1(b2), this configuration prevents the formation of the gap A at the back side of the hole 10A.

Thereafter, as shown in FIG. 4(c), the liquid crystal material LC is injected further toward the back of the hole 10A. Unlike the case shown in FIG. 1(b4), the bubbles B do not occur around the hole 10A after the liquid crystal material completely fills the empty cell. Thus, the degradation of display quality around the hole 10A is prevented.

Below, the configuration of the liquid crystal display device 100 is further described by referring again to FIGS. 3(a) to 3(b).

In the present embodiment, the liquid crystal display device 100 includes an input/output device 30 arranged in the hole 10A. The input/output device 30 is a push-down electronic switch, for example, and a hardware button provided in a smartphone corresponds to the switch, for example.

Now, the input/output device 30 is described in greater detail. In the liquid crystal display device 100, the input/output device 30 is arranged inside the hole 10A of the liquid crystal panel 10 and connected to the circuit substrate 20 via a connector. In the present embodiment, a through-hole is provided also on the backlight 40 disposed between the liquid crystal panel 10 and the circuit substrate 20, and the input/output device 30 is connected to the circuit substrate 20 by passing through the hole that penetrates the liquid crystal panel 10 and the backlight 40.

The input/output device 30 may be various types of devices such as a mechanical/electrical switch or button that receives input from the user, an optical element capable of receiving light from outside, a sound/speech output device, or a light-emitting device.

More specifically, the input/output device 30 may be a push-button, direction key (cross-shaped key), analog stick, touch panel (touch sensor), rotary switch (volume controller), rotatable selector (jog dial), toggle switch, trackball, trackpad, stick-type pointing device, hardware keyboard, or the like that can receive input (direct operation) from the user.

In addition, the input/output device 30 includes an imaging device (CCD image sensor, CMOS image sensor, or the like), an optical element (fiber optic faceplate or the like), or an optical sensor (a light sensor, a proximity sensor, or the like) that can receive optical input. Besides these, the input/output device may be a temperature sensor, a microphone, an input terminal such as HDMI (registered trademark) or USB, a wiring terminal such as a plug or outlet, or the like.

Furthermore, the input/output device 30 may be a sound/speech output device such as a speaker, a light-emitting device such as an LED, a display device that operates by itself independent of the liquid crystal panel 10, or the like.

The input/output device 30 is connected to the circuit substrate 20 arranged on the back side of the liquid crystal panel 10 either physically, electronically, or optically. A signal from the input/output device 30 or a signal to the input/output device 30 may be processed and generated in various types of processing units provided on the circuit substrate 20.

When using a volume controller as the input/output device 30, the input/output device 30 may have a portion that protrudes out of the viewer side surface of the liquid crystal panel 10, for example. Also, as the portion that protrudes out from the liquid crystal panel 10, the input/output device 30 may have a wide-width part that has a larger diameter than the diameter of the hole 10A. Using this wide-width part to hide the non-display region RF2 around the hole can improve the sense of coherency between the input/output device 30 and the display screen. The wide-width part may be provided so as to be fixed to the input/output device 30 after the input/output device 30 is mounted on the circuit substrate 20 via the hole 10A.

The input/output device 30 may include a part that can be attached and detached and be constituted by an operating section that is arranged in the hole 10A in the display panel 10 and that is connected to the circuit substrate 20, and a stick section that can attach to and detach from the operating section, for example. In this case, the input/output device can be used as an input device such as an analog controller by the user mounting the stick section in a fitting hole or a screw hole provided in the operating section as needed.

Now, the wiring around the hole 10A in the TFT substrate 11 will be described. As disclosed in Patent Documents 2 and 3, the matrix wiring lines around the hole 10A may be formed so as be diverted around the hole 10A, for example.

In the liquid crystal display device 100, source wiring (not shown) extending in the vertical direction and gate wiring (not shown) extending in the horizontal direction are provided around the hole 10A so as to be diverted around the hole 10A. In this configuration, pixels can be provided in a matrix in areas other than the area around the hole 10A, and an image or the like can be displayed by supplying a signal to the pixels via the respective TFTs connected to the gate wiring and the source wiring. A TFT channel provided in the pixel may be formed by amorphous silicon, low temperature polysilicon showing crystalline characteristics, an oxide semiconductor such as an In—Ga—Zn—O semiconductor, or the like. The In—Ga—Zn—O semiconductor may be amorphous or include crystalline parts.

However, by allowing the wiring to be diverted around the hole 10A, a region where the pixels cannot be arranged may be formed around the hole 10A. In this case, the wiring region around the hole that cannot be used for display may be covered with a black matrix in order to prevent light leakage. As described later using FIG. 14, at least one part of the wiring region around the hole may be covered by the hole-periphery sealing part 13A.

The liquid crystal display device 100 of the present embodiment may be configured so as to display an image related to the input/output device 30 within the display region (around the hole 10A or the input/output device 30, for example) of the liquid crystal panel 10. When a volume controller is provided as the input/output device 30, the current magnitude of volume determined by the operation by the user may be displayed around the input/output device 30, for example.

Displaying information related to the input/output device 30 in the areas surrounding the device can improve user-friendliness. Also, it is possible to use a display image to allow the user to recognize the current function of the current input/output device 30. For this reason, the liquid crystal display device also has the advantage that the input/output device 30 is easy to apply for many purposes.

A known image processing device (image processing unit) can perform control of displayed images around the hole. The image processing device may include a computation processing unit, a graphic processing unit, a memory, or the like provided on the circuit substrate, for example. The image processing device is configured so as to be able to generate image data on the basis of a signal outputted from the input/output device 30. In this configuration, related images around the input/output device 30 can be displayed around the input/output device 30.

Also, a touch panel may be provided on the viewer side of the liquid crystal panel 10 in the liquid crystal display device 100. The touch panel may have a known configuration, and an Out-Cell, On-Cell, or In-Cell touch panel may be used as desired. In an In-Cell touch panel, electrodes that constitute a touch sensor (a plurality of sensor wiring lines) or the like are provided within the liquid crystal panel 10.

Figure 5:
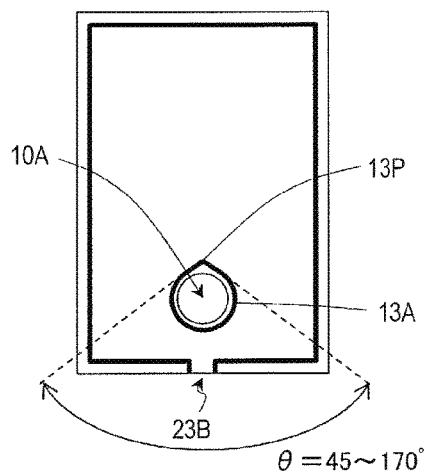
FIG. 5 is a view used to describe various types of configurations of a liquid crystal panel of Embodiment 1.
Figure 5:
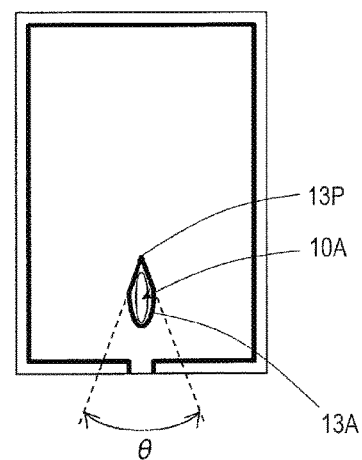
Figure 5:
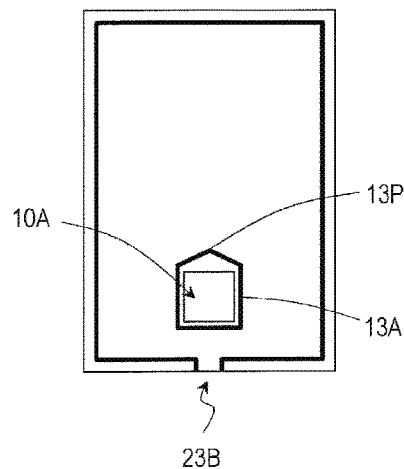
Figure 5:
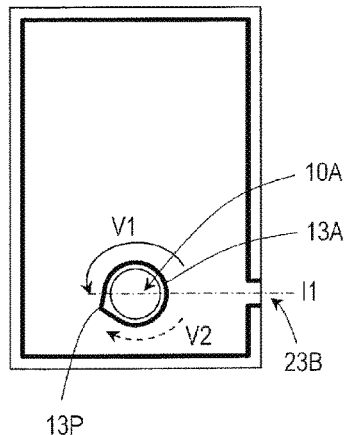
Figure 6:
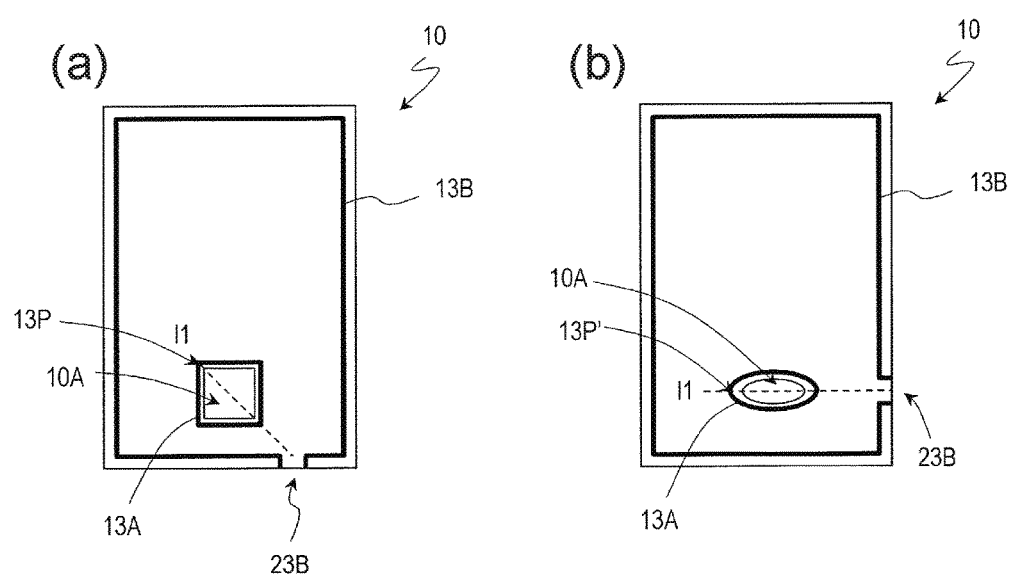
FIGS. 6(a) and 6(b) are plan views showing other modification examples of the liquid crystal panel of Embodiment 1.

Next, various types of embodiments of the liquid crystal panel 10 of the present embodiment will be described with reference to FIGS. 5 and 6.

FIG. 5(a) is a view used to describe the shape of the angled portion 13P included in the hole-periphery sealing part 13A. As shown in the figure, the shape of the angled portion 13P may be defined by the angle θ thereof. The angle θ of the angled portion 13P is set to 45° to 170°, for example. The angle θ may be suitably set by considering the size of the hole 10A, the fluidity of liquid crystal material, the cell gap, or the like.

Table 1 below shows the result of observation about whether bubbles occurred around the hole as the angle θ of the angled portion 13P was changed between 45° to 180°. In the column titled "presence of bubbles," ○ indicates that no bubbles occurred, Δ indicates that there were times when bubbles did occur and times when bubbles did not occur, and × indicates that bubbles occurred. As Table 1 shows, compared with cases when the angled portion is not provided (in other words, when the angle θ is 180°), setting the angle θ of the angled portion to be between 45° and 170° is effective in preventing the occurrence of bubbles. Also, the result of Table 1 shows that it is preferable that the angle θ be set between 45° and 150°.

TABLE 1

| Angle θ of Angled Portion | Presence of Bubbles |
|---|---|
| 45° | ○ |
| 90° | ○ |
| 150° | ○ |
| 160° | Δ |
| 170° | Δ |
| 180° (no angled portion) | × |

As FIG. 5(b) shows, when the angle θ is an acute angle with less than 45°, forming the hole 10A is often more difficult. For this reason, it is preferable that the angle θ be set to be greater than or equal to 45°. However, if the hole can be formed appropriately, the angle θ may be less than 45°.

FIG. 5(c) shows the panel structure when the shape of the hole 10A is approximately a square. In this case, the hole-periphery sealing part 13A has a shape corresponding to that of the hole 10A. In order to increase the region that can be used for display, it is preferable that the hole-periphery sealing part 13A have a shape that corresponds to the hole 10A.

However, the hole-periphery sealing part 13A also includes the angled portion 13P on the back side of the hole (namely, the side opposite to the side of the liquid crystal injection hole 23B). This configuration prevents the occurrence of bubbles when liquid crystal material is injected into the back side of the empty cell from the liquid crystal injection hole 23B because the angled portion 13P is provided.

FIG. 5(d) shows an additional modification example. In the configuration shown in FIG. 5(d), the liquid crystal injection hole 23B is provided at a position on the right side of the liquid crystal panel in the figure and slightly off the middle of the right side (a position closer to the lower side, specifically). In this example, in the liquid crystal injection process, the region where the spread of liquid crystal material is fast and the region where the spread is slow are formed. In the example shown, as shown by a solid arrow V1 in FIG. 5(d), the spread of liquid crystal material is fast on the upper side of the hole 10A, and as shown by a dotted arrow V2 in FIG. 5(d), the spread of liquid crystal material is slow on the lower side of the hole 10A. As a result, it can be inferred that the meeting point of liquid crystal material that is separated into the upper side and the lower side of the hole 10A and that wraps around the hole 10A will be shifted in position from a straight line 11 that passes through the center of the liquid crystal injection hole 23B and the hole 10A. In this case, in order to prevent the occurrence of bubbles more effectively, the angled portion 13P may be provided at the predicted meeting point of liquid crystal material, or in other words, the position off from the straight line 11.

However, the apex of the angled portion 13P will be typically provided on the straight line 11 or in the vicinity thereof. Specifically, the apex of the angled portion 13P is provided at a position such that the angle formed by the straight line 11 and the straight line that connects the center of the hole 10A to the apex of the angled portion 13P is 0° to 40°, for example.

FIGS. 6(a) and 6(b) show additional modification examples of the liquid crystal panel of the present embodiment. As shown in the FIGS. 6(a) and 6(b), the hole-periphery sealing part 13A has a shape of a square or an ellipse corresponding to the shape of the hole 10A. In this configuration, the angled portion 13P or a protrusion 13P' included in the hole-periphery sealing part 13A are arranged near the straight line 11 that passes through the center of the hole 10A and the injection hole 23B. This configuration prevents the formation of a gap when liquid crystal material injected from the injection hole 23B wraps around to the back of the hole-periphery sealing part 13A and the degradation of display quality around the hole.

A specific manufacturing process of the liquid crystal panel 10 will be described below.

After manufacturing the TFT substrate 11 and the opposite substrate 12 by a known method, a sealing member is provided on one of the substrates (here, the TFT substrate 11). The sealing member is provided in a line-shape having a width of approximately 1 mm using a known dispenser device, for example. An ultraviolet curable or thermosetting resin material (acrylic resin or the like) can be used as a material for the sealing member, and "Photolec," which is a UV curable sealing member made by Sekisui Chemical Co., Ltd., or the like can be used, for example.

In the process of providing the sealing member, a frame-shaped outer sealing member is provided on the periphery of the TFT substrate 11, and a hole-periphery sealing member is provided around the area where the through-hole 10A (see FIG. 1(a3)) is formed in a subsequent step. The hole-periphery sealing member is provided within the area enclosed by the outer sealing member.

The side of the hole-periphery sealing member opposite to the injection hole 23B includes an angled portion. The angled portion can be formed by appropriately controlling the dispenser device described above. After arranging the TFT substrate 11 and the opposite substrate 12 to face each other, by hardening the sealing member with heat or ultraviolet light, the outer sealing part 13B and the hole-periphery sealing part 13A including the angled portion 13P are formed, and the process of bonding the substrates 11 and 12 together is completed. Providing a plurality of photospacers having the same height over the entire substrate surface of the opposite substrate 12 makes it easier to set the cell gap over the entire panel surface at a desired thickness.

Next, the through-hole 10A (the hole 10A) that penetrates the TFT substrate 11 and the opposite substrate 12 is formed in the inner side of the hole-periphery sealing part 13A. The hole 10A can be formed by scribing (laser scribing or mechanical scribing), by using a laser, a drill, or the like, or by waterjet cutting, for example. The process of forming the hole 10A may be performed after the liquid crystal injection process.

In this manner, a space that is sealed from the outside is formed between the pair of the substrates 11 and 12 (except for the part having the liquid crystal injection hole 23B), and a so-called empty cell is completed. The process of injecting liquid crystal material into the empty cell is performed as described in FIGS. 4(a) to 4(c). In that manner, the liquid crystal panel 10 including the through-hole 10A therein can be obtained while preventing the occurrence of bubbles around the hole.

According to the liquid crystal display device 100 that includes the liquid crystal panel 10 of the present embodiment, when forming a liquid crystal layer by the vacuum injection method, the input/output device 30 that passes through the hole 10A provided within the display region RA can be provided, and the degradation of display quality around the hole 10A can be prevented.

Embodiment 2

Figure 7:
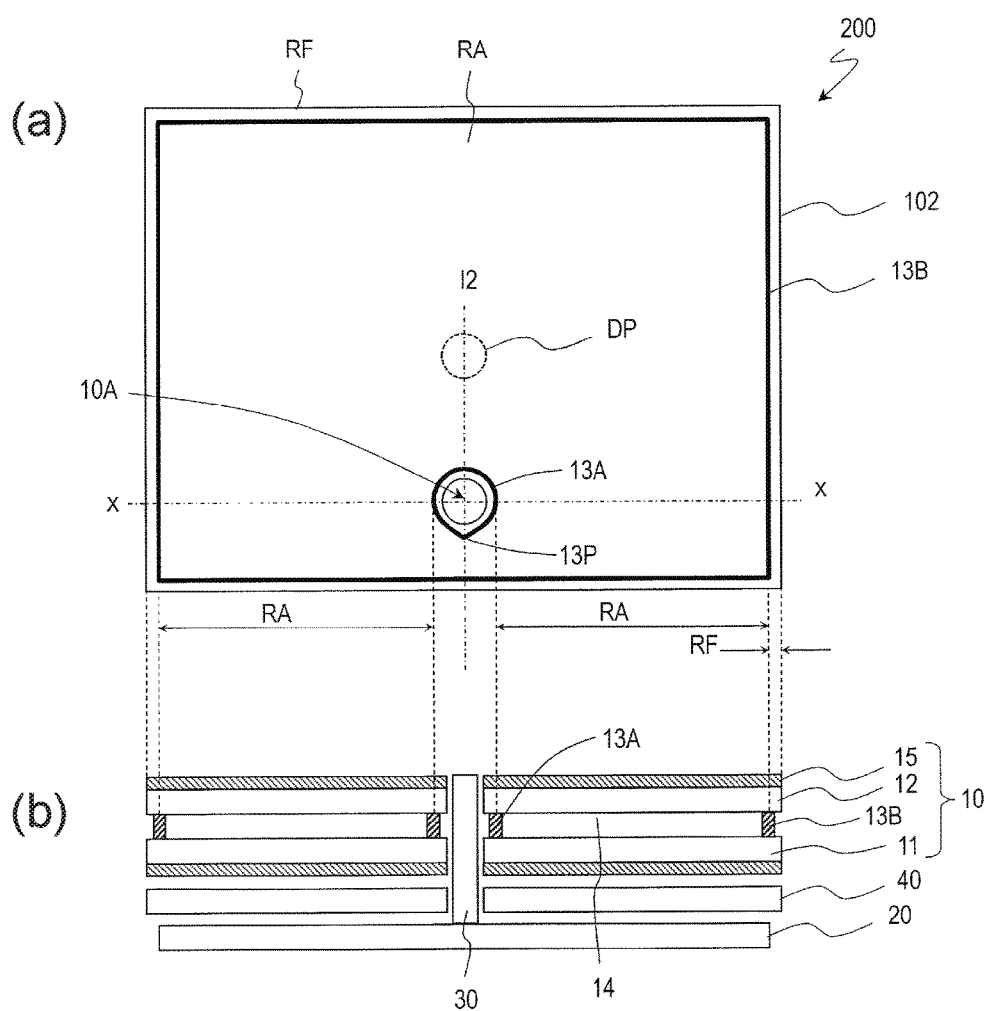
FIG. 7 is a view showing a configuration of a liquid crystal display device according to Embodiment 2 of the present invention.

FIGS. 7(a) and 7(b) are a plan view and a cross-sectional view of a liquid crystal display device 200 that includes a liquid crystal panel 102 of Embodiment 2. In the present embodiment, unlike the liquid crystal panel 10 of Embodiment 1, liquid crystal material is sealed between the substrates by the ODF method, not by the vacuum injection method. For convenience, in the present embodiment, the same reference characters are used for the same constituting elements in Embodiment 1, and detailed descriptions thereof may be omitted.

As shown in FIGS. 7(a) and 7(b), the display region of the liquid crystal panel 102 of the present embodiment also includes a through-hole 10A, and a hole-periphery sealing part 13A for sealing a liquid crystal layer 14 between substrates is provided around the through-hole. An outer sealing part 13B having a closed-loop shape is provided on the periphery of the liquid crystal panel 102. A liquid crystal injection hole is not provided in the outer sealing part 13B because liquid crystal material is sealed between the substrates by the ODF method in the present embodiment.

In the present embodiment, also, the hole-periphery sealing part 13A includes an angled portion 13P. However, the angled portion 13P is provided, on the side of the hole 10A opposite to the liquid crystal drip location DP (behind the hole 10A as seen from the liquid crystal drip location DP), on or near a straight line 12 going across a location where liquid crystal is dripped by the ODF method (here, approximately the middle of the liquid crystal panel 10) and the center of the hole 10A.

The manufacturing process of the liquid crystal panel 102 will be described below.

First, sealing members that respectively correspond to the outer sealing part 13B and the hole-periphery sealing part 13A shown in FIG. 7(a) are provided on one of the substrates (TFT substrate 11, for example) using a known dispenser device. In a manner similar to Embodiment 1, the sealing members are ultraviolet curable or thermosetting resin material (acrylic resin or the like) and provided in a line having a width of about 1 mm, for example. Next, under a vacuum, liquid crystal material is dripped at the location DP around the center of the substrate on which the sealing members are provided.

Thereafter, a process of bonding together the two substrates, namely the TFT substrate 11 and an opposite substrate 12, is performed. In this process, the outer sealing part 13B and the hole-periphery sealing part 13A are formed by hardening the sealing members by heat or ultraviolet light before the sealing members make contact with liquid crystal material.

The liquid crystal layer 14 is formed by spreading liquid crystal material over the entire surface of the substrate after the outer sealing part 13B and the hole-periphery sealing part 13A are formed. The liquid crystal layer 14 fills the space, between the substrates, that is inside the outer sealing part 13B and outside the hole-periphery sealing part 13A.

In this step, the formation of a gap when liquid crystal material spreading from the liquid crystal drip location DP wraps around to the back of the hole-periphery sealing part 13A is prevented because the hole-periphery sealing part 13A includes the angled portion 13P on the side of the hole 10A opposite to the liquid crystal drip location DP.

Finally, the hole 10A that penetrates the TFT substrate 11 and the opposite substrate 12 is formed in the inner side of the hole-periphery sealing part 13A. The hole 10A can be formed by scribing (laser scribing or mechanical scribing), by using a laser, a drill, or the like, or by waterjet cutting, for example.

According to the liquid crystal display device 200 that includes the liquid crystal panel 102 of the present embodiment, when forming a liquid crystal layer by the ODF method, the input/output device 30 that passes through the hole 10A provided within the display region RA can be provided, and the degradation of display quality around the hole 10A can be prevented.

FIGS. 8(a) to 8(d) show various types of configurations of the liquid crystal panel of the present embodiment. In any of the configurations described below, the liquid crystal layer is formed by the ODF method. FIGS. 8(a) to 8(d) respectively show the drip location DP of liquid crystal material in each of the configurations. In all of the configurations, the outer sealing part 13B provided on the periphery of the liquid crystal panel is provided in a closed-loop shape along the edges of the panel so as to seal the liquid crystal layer in the inside thereof.

Figure 8:
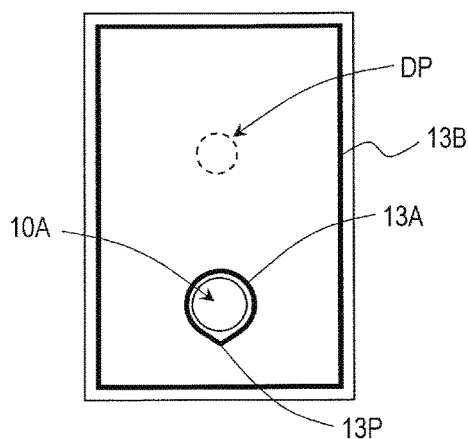
FIG. 8 is a view used to describe various types of configurations of a liquid crystal panel of Embodiment 2.
Figure 8:
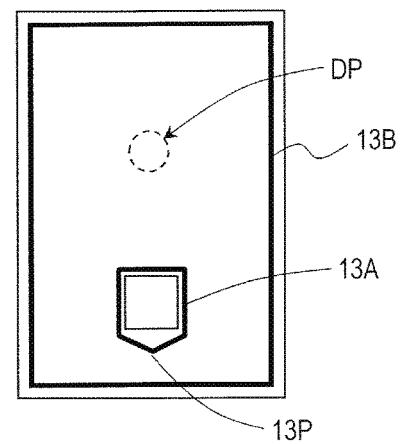
Figure 8:
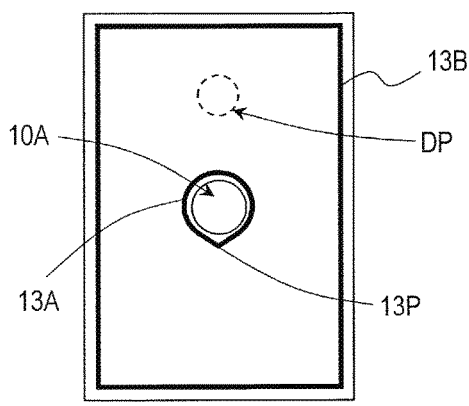
Figure 8:
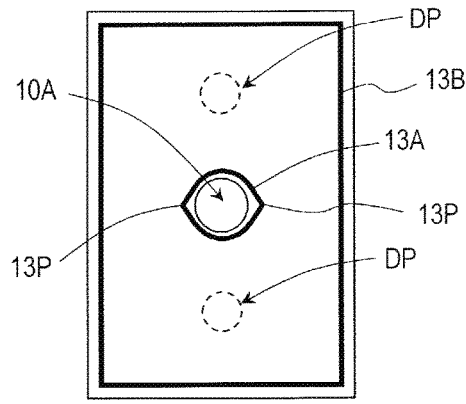

Like the configuration shown in FIGS. 7(a) and 7(b), FIG. 8(a) shows a configuration in which the hole 10A having a circular shape is provided in the lower region of the liquid crystal panel. In this configuration, the drip location DP is near the center of the panel, and the angled portion 13P is formed below the hole-periphery sealing part 13A. FIG. 8(b) shows a case in which the shape of the hole 10A in the configuration shown in FIG. 8(a) is a square. Also, in this case, the angled portion 13P is provided below the hole-periphery sealing part 13A.

FIG. 8(c) shows a configuration in which the hole 10A having a circular shape is provided in the center of the panel. In the configuration shown, the drip location DP of liquid crystal is arranged in the upper region of the panel. Also, in this case, the angled portion 13P is provided facing the lower side of the hole-periphery sealing part 13A. The location of the angled portion 13P may be suitably chosen in accordance with the drip location DP of liquid crystal and the location of the hole 10A.

In FIG. 8(d), the hole 10A having a circular shape is provided in the center of the panel, and there are two drip location DP of liquid crystal, which are in the upper and the lower regions of the panel, respectively. In this case, in the substrate bonding process, liquid crystal material dripped at the two liquid crystal drip locations DP flow toward the hole-periphery sealing part 13A from both the upper side and the lower side thereof. The liquid crystal material that flows from the upper side and the lower side typically join together at the positions to the right and the left of the hole 10A, respectively. In this configuration, providing the angled portion 13P on the left side and the right side of the hole 10A respectively can allow liquid crystal material to flow along the hole-periphery sealing part 13A and prevent the occurrence of bubbles.

Embodiment 3

Figure 9:
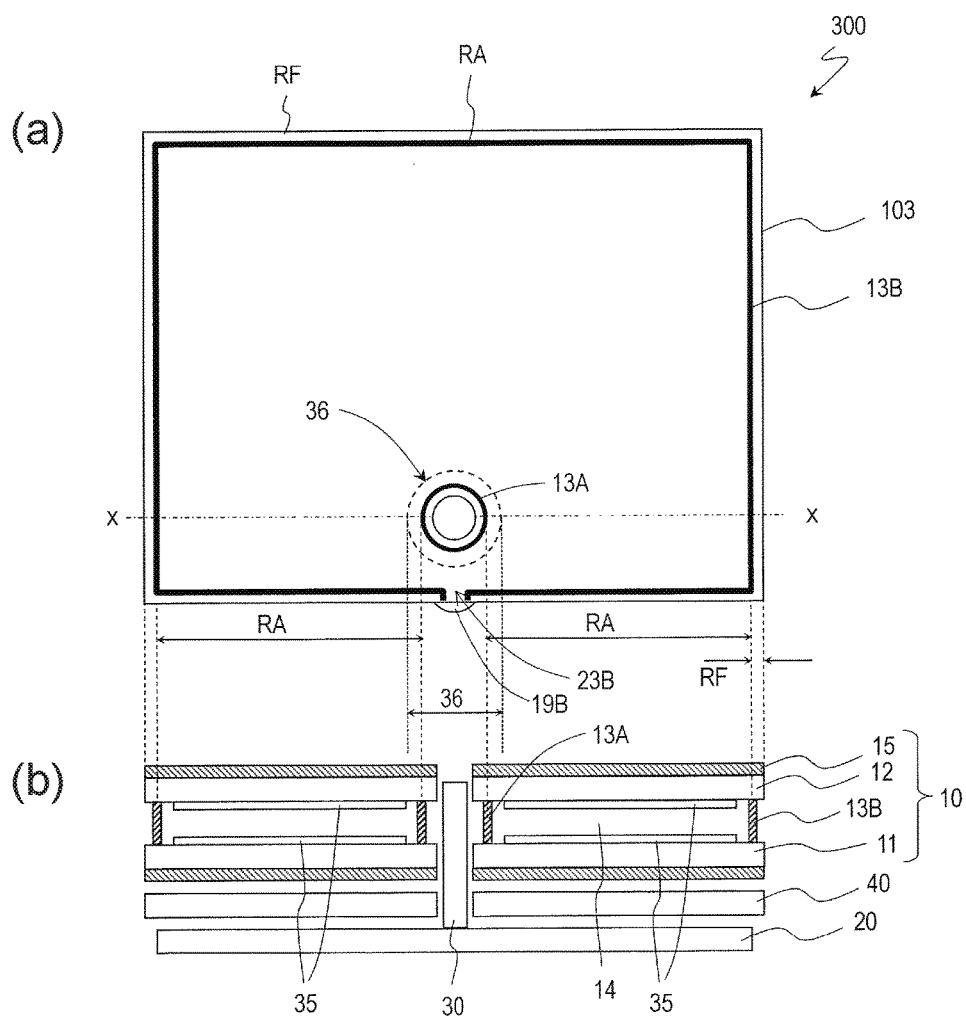
FIG. 9 is a view showing a configuration of a liquid crystal display device according to Embodiment 3 of the present invention.

FIGS. 9(a) and 9(b) are a plan view and a cross-sectional view of a liquid crystal display device 300 that includes a liquid crystal panel 103 of Embodiment 3. Unlike the liquid crystal panels 10 and 102 of respective Embodiments 1 and 2, in the present embodiment, a region where liquid crystal material can flow more easily is formed around a hole-periphery sealing part 13A instead of providing the angled portion or the protrusion 13P in the hole-periphery sealing part 13A. For convenience, in the present embodiment, the same reference characters are used for the same constituting elements in Embodiment 1, and detailed descriptions thereof may be omitted.

In the present embodiment, a TFT substrate 11 and an opposite substrate 12 each include a layered structure 35 on the side of a liquid crystal layer 14. The layered structure 35 includes an opening region 36 that overlaps with a region that has a prescribed width and that is located outside the hole-periphery sealing part 13A. The opening region 36 is the region 36 where the layered structure 35 is not provided, and the cell thickness of the region 36 is larger than the cell thickness of the other region.

Figure 10:
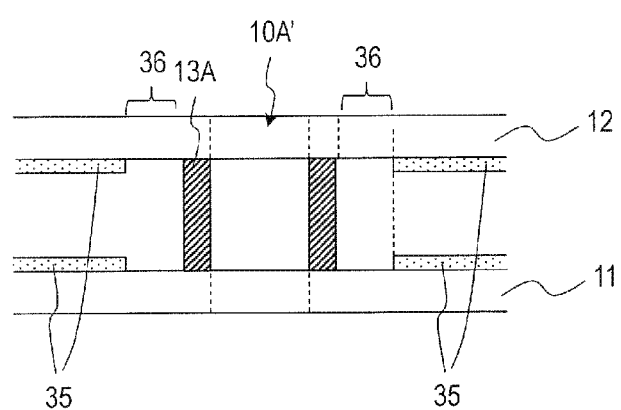
FIG. 10 is an enlarged cross-sectional view that shows a configuration around the hole in the liquid crystal panel of Embodiment 3.

FIG. 10 is a cross-sectional view that enlarges the area around the hole 10A of the liquid crystal panel 103 (FIG. 10 shows a section 10A' where the hole 10A is to be formed later). The layered structure 35 provided on the opposite substrate 12 may include a color filter layer (1 to 2 μm), an overcoat layer (2 to 3 μm), or the like. The layered structure 35 provided on the TFT substrate 11 may include an inorganic protective film (approximately 0.2 μm) that covers the TFTs, a planarizing film (2 to 3 μm) made of organic insulating material or the like, etc.

The opening region 36 where the layered structure 35 is not formed is a region with a thick cell thickness. In contrast to the cell thickness of about 3 μm for the region where the layered structure 35 is formed, the cell thickness of the opening region 36 is about 7 μm, for example. The opening region 36 is provided so as to have a prescribed width (about 0.1 to 1 mm, for example) outside the hole-periphery sealing part 13A. The opening region 36 is formed by making an opening in the corresponding region by using a photolithography method or the like in the process of forming the layered structure 35.

By providing the opening region 36 where the layered structure 35 does not exist, as shown in FIG. 11(a), liquid crystal material LC preferentially flows into the opening region 36 because the flow speed of the liquid crystal material LC in the opening region 36 is relatively fast when the liquid crystal material LC flows so as to wrap around to the back of the hole 10A from both sides of the hole in the liquid crystal injection process. Because of this, as shown in FIG. 11(b), the liquid crystal material joins together at the back side of the hole 10A without forming a gap. Thus, as shown in FIG. 11(c), the occurrence of bubbles around the hole 10A is prevented.

Figure 12:
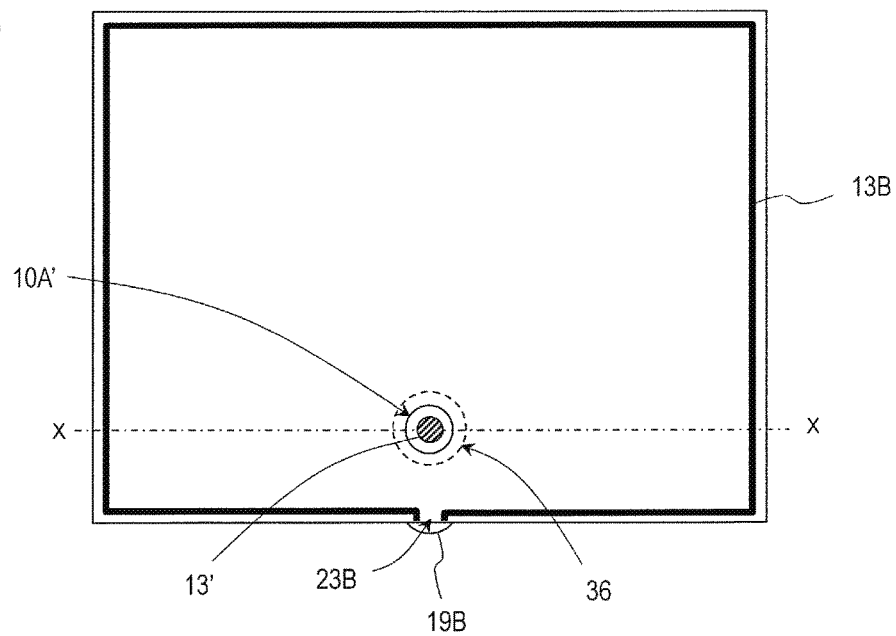
FIG. 12 is a view used to describe one example of a manufacturing process of a liquid crystal panel of Embodiment 3.
Figure 12:
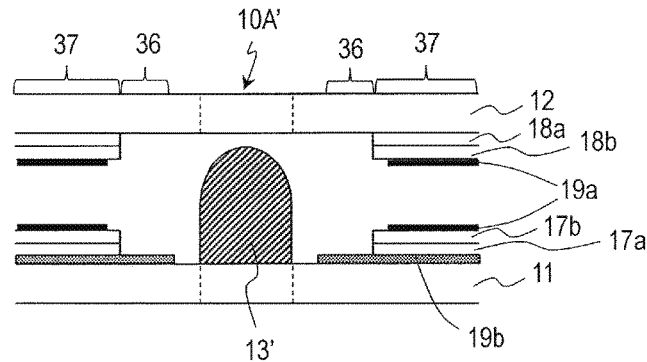
Figure 12:
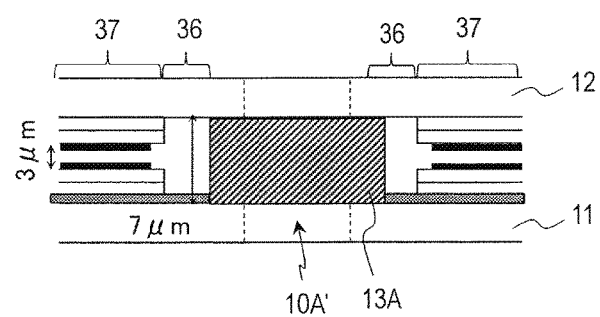

FIGS. 12(a) to 12(c) are views used to describe one example of a manufacturing process of the liquid crystal panel 103 of the present embodiment.

First, the TFT substrate 11 and the opposite substrate 12 are prepared. As shown in FIG. 12(b), the layered structure 35 (a black matrix, a color filter layer 18a, and an overcoat layer 18b) is not provided around a region 10A' of the opposite substrate 12 where the hole 10A is to be formed. Similarly, the layered structure 35 (a passivation layer 17a and an insulating layer between organic layers 17b) is not provided around the region 10A' of the TFT substrate 11 where the hole 10A is to be provided.

In this configuration, compared to the cell thickness of a pixel array region 37 (about 3 μm), the cell thickness of the opening region 36 where the cell thickness around the hole is larger is about 4 μm thicker. The transparent electrodes 19a provided on the TFT substrate 11 and the opposite substrate 12 may only be provided within the pixel array region 37. A circuit layer 19b that includes TFTs provided on the TFT substrate 11, source wiring, gate wiring, and the like may include a section formed inside the region 36 where the cell thickness is large because the circuit layer includes wiring that is diverted around the hole 10A.

Next, as shown in FIGS. 12(a) and 12(b), in the present embodiment, in the process of providing sealing members on one of the substrates (here the TFT substrate 11), the sealing member 13' used to form the hole-periphery sealing part 13A is provided in a dot shape or a planar shape at the center of the region 10A' where the hole 10A is to be formed later.

Thereafter, in the substrate bonding process, the provided sealing member 13' is pushed and spread by the substrates and spreads over the region 10A' where the hole is to be formed. However, the amount of the sealing member 13' is adjusted so as not to reach the section of the layered structure 35 after being pushed and spread (in other words, an amount that does not cover the entire opening region 36 of the layered structure 35). As shown in FIG. 12(c), even after the hole-periphery sealing part 13A is formed by hardening the sealing member, a region with large cell thickness (opening region 36) remains on the outside of the hole-periphery sealing part 13A.

Figure 11:
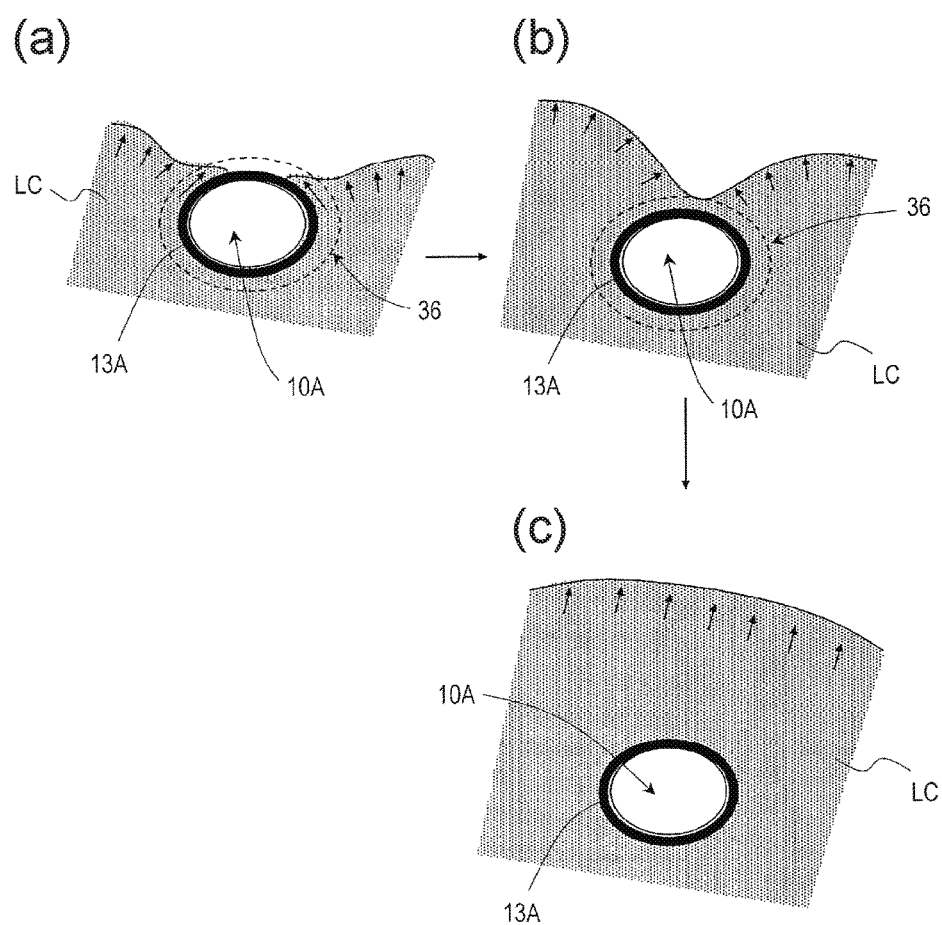
FIGS. 11(a) to 11(c) sequentially show steps of how liquid crystal material flows around the hole in a manufacturing process of a liquid crystal panel of Embodiment 3.

Thereafter, as described using FIG. 11, the process of filling the liquid crystal layer between the substrates is performed. The filling process of the liquid crystal layer may be performed by the vacuum injection method or the ODF method. In either case, the occurrence of bubbles is prevented because the liquid crystal material LC that flows toward the hole 10A from the liquid crystal injection hole 23B or the liquid crystal drip location DP wraps around to the back side of the hole 10A relatively quickly in the opening region 36 of the layered structure 35.

Thereafter, in a step not shown, in a manner similar to Embodiments 1 and 2, the hole 10A is provided so as to penetrate the TFT substrate 11, the opposite substrate 12, and the hole hole-periphery sealing member 13A, and the liquid crystal panel including the hole 10A within the display region is obtained. The process of forming the hole 10A can be performed before the liquid crystal filling process described above.

According to the liquid crystal display device 300 that includes the liquid crystal panel 103 of the present embodiment, when forming a liquid crystal layer by either the vacuum injection method or the ODF method, the input/output device 30 that passes through the hole 10A provided within the display region RA can be provided, and the degradation of display quality around the hole 10A can be prevented.

Embodiment 4

Figure 13:
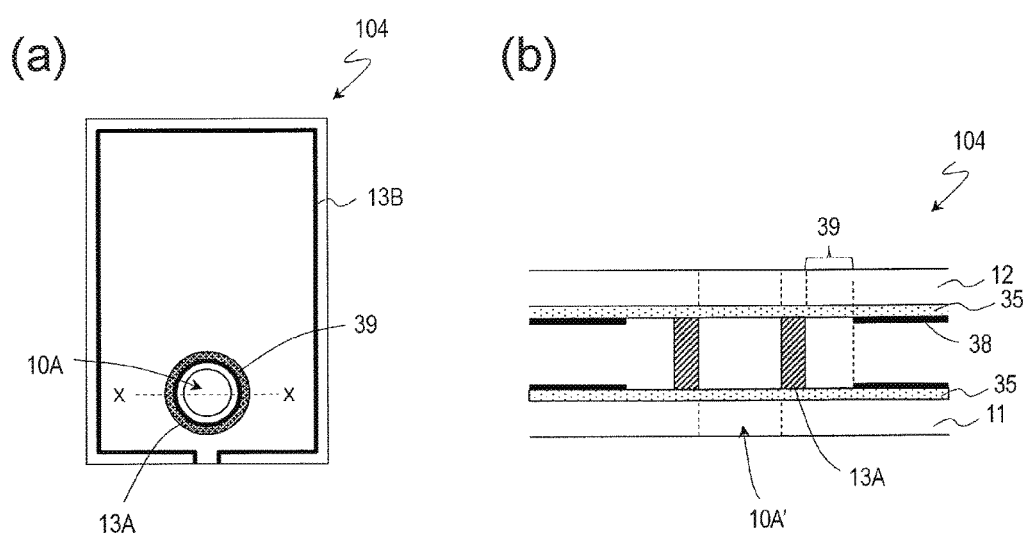
FIG. 13 is a view used to describe a liquid crystal panel of Embodiment 4 of the present invention.

FIGS. 13(*a*) and 13(*b*) are views used to describe a liquid crystal panel 104 of Embodiment 4. The liquid crystal panel 104 of the present embodiment differs from the liquid crystal panel 103 of Embodiment 3 in that an opening region 39 does not include a vertical alignment film 38, rather than the layered structure 35, around a hole 10A.

FIGS. 13(*a*) and 13(*b*) show that, in the liquid crystal panel 104, there is a region that is outside the hole-periphery sealing part 13A and that has a prescribed width where the vertical alignment film 38 is not provided. In the liquid crystal injection process, unlike in the region where the vertical alignment film 38 is provided, the fluidity of liquid crystal molecules does not decrease in the region 39 due to the alignment regulating force of the vertical alignment film 38. For this reason, in a manner similar to Embodiment 4 described using FIGS. 11(*a*) to 11(*c*), the flow of liquid crystal material wrapping around the hole-periphery sealing part 13A is promoted more than in other regions. This achieves a configuration in which bubbles are less likely to occur.

According to the configuration of the present embodiment, the effect of preventing the occurrence of bubbles can be achieved either when using the vacuum injection method or the ODF method.

Embodiment 5

Figure 14:
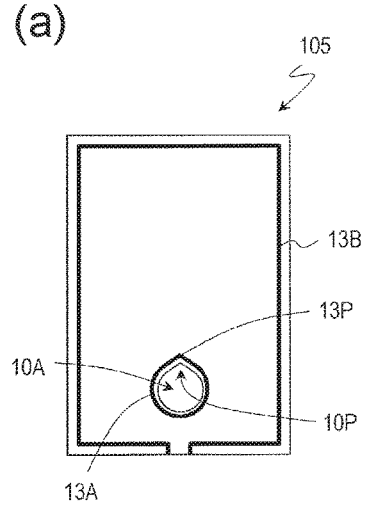
FIG. 14 is a view used to describe a liquid crystal panel of Embodiment 5 of the present invention.
Figure 14:
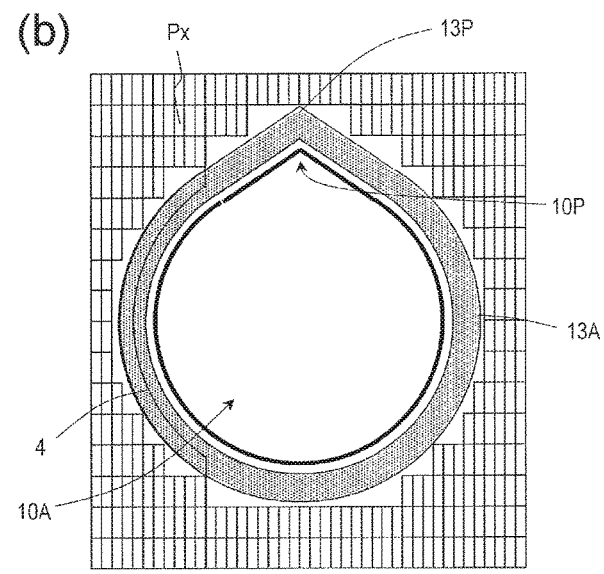
Figure 14:
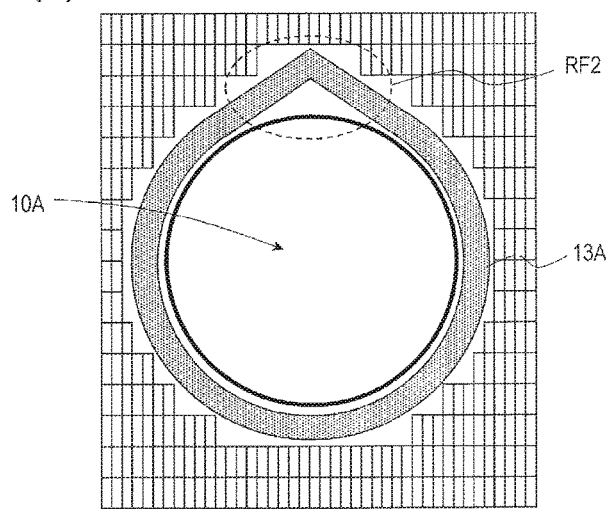

FIG. 14(*a*) shows a liquid crystal panel 105 of Embodiment 5, and FIG. 14(*b*) shows an enlarged region around a hole 10A in the liquid crystal panel 105. FIG. 14(*c*) is an enlarged view of the area around the hole in the liquid crystal panel of a reference example.

As can be seen from FIGS. 14(*a*) and 14(*b*), the hole 10A in the liquid crystal panel 105 has a shape similar to (resembling) that of the hole-periphery sealing part 13A. In other words, the hole 10A includes an angled portion 10P at a location that corresponds to an angled portion 13P of the hole-periphery sealing part 13A.

Wiring is provided around the hole 10A so as to overlap with the hole-periphery sealing part 13A. Although FIG. 14(*b*) shows only one source wiring line 4, a plurality of source wiring lines and gate wiring lines may be provided so as to overlap with the hole-periphery sealing part 13A. On the other hand, a pixel Px is not provided in the region occupied by the hole-periphery sealing part 13A. This region is typically covered by a black matrix for preventing light leakage.

For this reason, as shown in FIG. 14(*c*), when the shape of the hole 10A and the shape of the hole-periphery sealing part 13A differ, the width of a non-display region RF2 becomes wider in some parts. When the width of the non-display region RF2 is not uniform in this manner, the appearance of the region is often bad.

Figure 15:
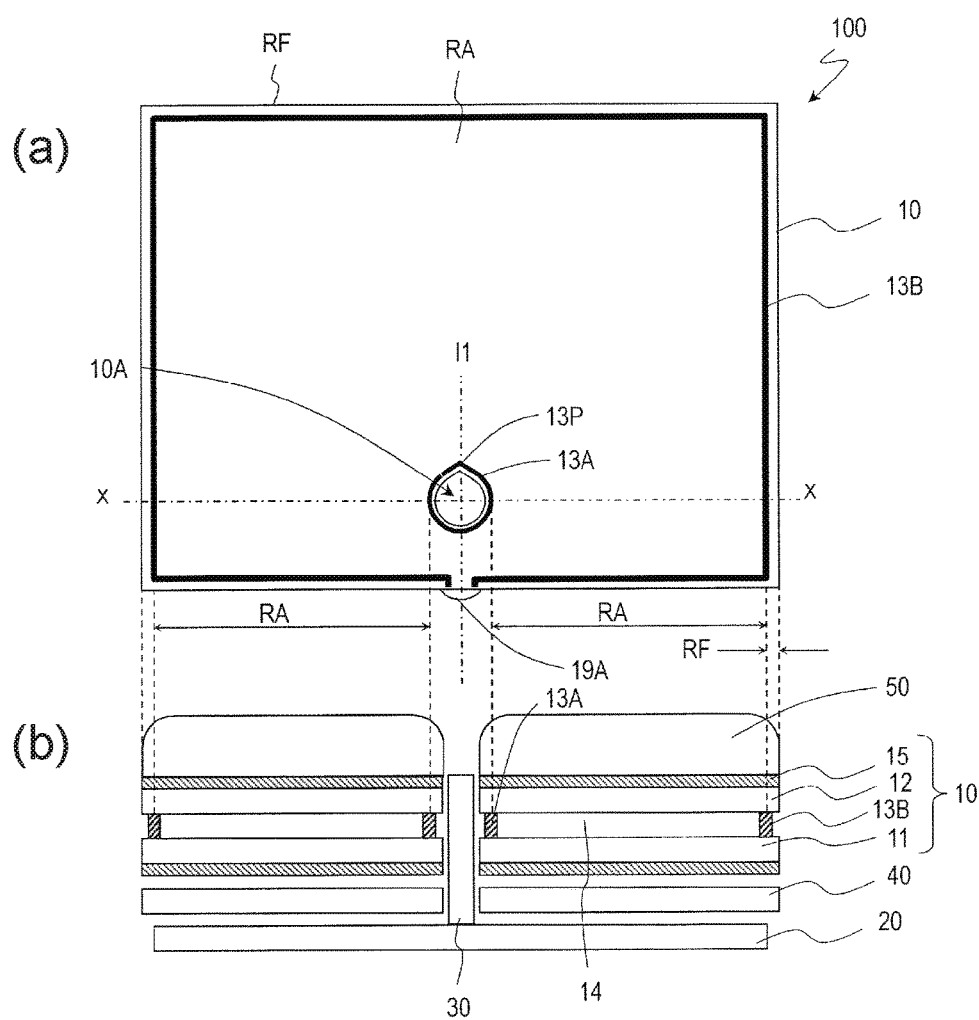
FIG. 15 is a view used to describe a liquid crystal display device including the liquid crystal panel of Embodiment 5 of the present invention.

As shown in FIGS. 15(*a*) and 15(*b*), when providing a transmissive cover 50 having a lens portion (curved portion) around the hole 10A on the front side of a liquid crystal panel 10, if the width of the non-display region is not uniform, the wide section of the non-display region becomes visible (the enlarged image formed by the lens portion is not displayed), thereby creating a problem that the appearance of the region is bad. For this reason, making the shape of the hole 10A similar to the shape of the hole-periphery sealing part 13A can make the width of the non-display region uniform, thereby achieving a configuration in which the non-display region is more obscured.

Embodiments of the present invention were described above, but it is apparent that various modifications can be made. The hole-periphery sealing part 13A may have a shape that includes a protrusion that fills the gap A shown in FIG. 1(*b*2) and does not need to include an angled portion, for example. The angled portion may have a shape in which two curves intersect, rather than a shape in which two straight lines intersect.

The present specification discloses a display panel, a display device, and a method of manufacturing a liquid crystal panel that are described below.

<Item 1>

A display panel including a pair of substrates and a display medium layer held between the pair of substrates, the display panel having a display region and a frame region outside the display region and including a hole on an inner side of the frame region penetrating the pair of substrates and the display medium layer, the display panel further including: a hole-periphery sealing part disposed between the pair of substrates so as to surround the hole, wherein the hole-periphery sealing part includes an angled portion or a protrusion.

According to the display panel of item 1, the occurrence of bubbles around the hole in the display medium layer can be avoided thereby preventing the degradation of display quality.

<Item 2>

The display panel according to item 1, further including: an outer sealing part provided so as to surround the display medium layer, wherein the outer sealing part includes an open section in a portion thereof, and wherein the angled portion or the protrusion of the hole-periphery sealing part is provided, behind the hole as seen from the open section of the outer sealing part, on or near a straight line going through the open section and across the hole.

According to the display panel described in item 2, when liquid crystal material is sealed between the substrates by the vacuum injection method, the occurrence of bubbles around the hole in the liquid crystal layer can be effectively suppressed.

<Item 3>

The display panel according to item 1, further including: an outer sealing part provided so as to surround the display medium layer, wherein the outer sealing part is provided in a closed loop shape, and wherein the angled portion or the protrusion of the hole-periphery sealing part is provided, behind the hole as seen from a center of the display region, on or near a straight line going through a center of the hole and the center of the display region.

According to the display panel described in item 3, when liquid crystal material is sealed between the substrates by the ODF method, the occurrence of bubbles around the hole in the liquid crystal layer can be effectively suppressed.

<Item 4>

The display panel according to any one of items 1 to 3, wherein the hole-periphery sealing part includes the angled portion, and the hole includes an angled portion that corresponds to the angled portion of the hole-periphery sealing part.

According to the display panel of item 4, the light-shielding region provided corresponding to the hole-periphery sealing part can be obscured.

<Item 5>

A display panel includes a pair of substrates and a display medium layer held between the pair of substrates, the display panel having a display region and a frame region outside the display region and including a hole on an inner side of the frame region penetrating the pair of substrates and the display medium layer, the display panel further including: a hole-periphery sealing part disposed between the pair of substrates so as to surround the hole; and at least one layered structure formed on at least one of the pair of substrates at a side facing the display medium layer, wherein the at least one layered structure is not formed in a region outside and adjacent to the hole-periphery sealing part so that a cell gap of the region is larger than a cell gap of another region where the at least one layered structure is formed.

According to the display panel of item 5, the occurrence of bubbles around the hole in the display medium layer can be avoided, thereby preventing the degradation of display quality.

<Item 6>

The display panel described in item 5, wherein the at least one layered structure includes at least one layer among a color filter layer, an overcoat layer, a protective layer, and an interlayer insulating layer.

According to the display panel of item 6, the occurrence of bubbles in the display medium layer can be suppressed by using the color filter layer, the overcoat layer, the protective layer, or the interlayer insulating layer provided in the display panel.

<Item 7>

A display panel, includes a pair of substrates and a display medium layer held between the pair of substrates, the display panel having a display region and a frame region outside the display region and including a hole on an inner side of the frame region penetrating the pair of substrates and the display medium layer, the display panel further including: a hole-periphery sealing part disposed between the pair of substrates so as to surround the hole; and at least one vertical alignment film formed on at least one of the pair of substrates at a side facing the display medium layer, wherein the at least one vertical alignment film is not formed in a region outside and adjacent to the hole-periphery sealing part.

According to the display panel of item 7, the occurrence of bubbles around the hole in the display medium layer can be avoided, thereby preventing the degradation of display quality.

<Item 8>

An electronic device including: the display panel according to any one of items 1 to 7; and an input/output device arranged in the hole in the display panel.

According to the electronic device described in item 8, display quality around the hole in an electronic device provided with an input/output device within the display region can be improved.

<Item 9>

A method of manufacturing a liquid crystal panel, including: a step of preparing a pair of substrates; a step of providing an outer sealing part and a hole-periphery sealing part on one of the pair of substrates; a step of spreading liquid crystal material over a surface of the one substrate by allowing the liquid crystal material provided at a location away from the hole-periphery sealing part to flow; a step of bonding the pair of substrates via the outer sealing part and the hole-periphery sealing part; a step of forming a hole within a region in the pair of substrates enclosed by the hole-periphery sealing part, wherein the hole-periphery sealing part includes an angled portion or a protrusion, wherein, in the step of spreading the liquid crystal material, the liquid crystal material spreads around the hole-periphery sealing part in at least two flows heading in mutually different directions and wrapping around the hole-periphery sealing part, and wherein the angled portion or the protrusion of the hole-periphery sealing part is provided at a point where the at least two flows heading in mutually different directions join together.

According to the method of manufacturing a liquid crystal panel of item 9, the occurrence of bubbles around the hole in the display medium layer can be avoided thereby preventing the degradation of display quality.

INDUSTRIAL APPLICABILITY

A display device according to the respective embodiments of the present invention is widely used in various types of electronic devices such as mobile gaming devices or smartphones.

DESCRIPTION OF REFERENCE CHARACTERS 100 liquid crystal display device (electronic device)
10 liquid crystal panel
10A through-hole
11 TFT substrate
12 opposite substrate
13A hole-periphery sealing part
13B outer sealing part
13P angled portion or protrusion
14 liquid crystal layer
15 optical film layer
20 driver circuit
23B liquid crystal injection hole
30 input/output device
40 backlight
RF frame region (non-active area)
RA display region (active area)

What is claimed is:

1. A display panel comprising a pair of substrates and a display medium layer held between the pair of substrates, said display panel having a display region and a frame region outside the display region and including a hole on an inner side of the frame region penetrating the pair of substrates and the display medium layer, the display panel further comprising:
   a hole-periphery sealing part disposed between the pair of substrates so as to surround the hole; and
   an outer sealing part provided so as to surround the display medium layer,
   wherein the hole-periphery sealing part includes an angled portion or a protrusion,
   wherein the outer sealing part includes an open section in a portion thereof,
   wherein the angled portion or the protrusion of the hole-periphery sealing part is provided, behind the hole as seen from the open section of the outer sealing part, on a straight line going through the open section and a center of the hole,
   wherein the hole has a shape similar to that of the hole-periphery sealing part.

2. The display panel according to claim 1, wherein an angle of the angled portion or the protrusion is between 45° to 180°.

3. The display panel according to claim 1, wherein the hole includes an angled portion or a protrusion, and the angled portion or the protrusion of the hole is disposed at a position corresponding to a position of the angled portion or the protrusion of the hole-periphery sealing part.

4. The display panel according to claim 1, further comprising a plurality of source wiring lines and/or gate wiring lines overlapping the hole-periphery sealing part.

* * * * *